(No Model.) 2 Sheets—Sheet 2.
E. HOLTHAUS.
RECORDING STEAM AND WATER GAGE.
No. 503,968. Patented Aug. 29, 1893.
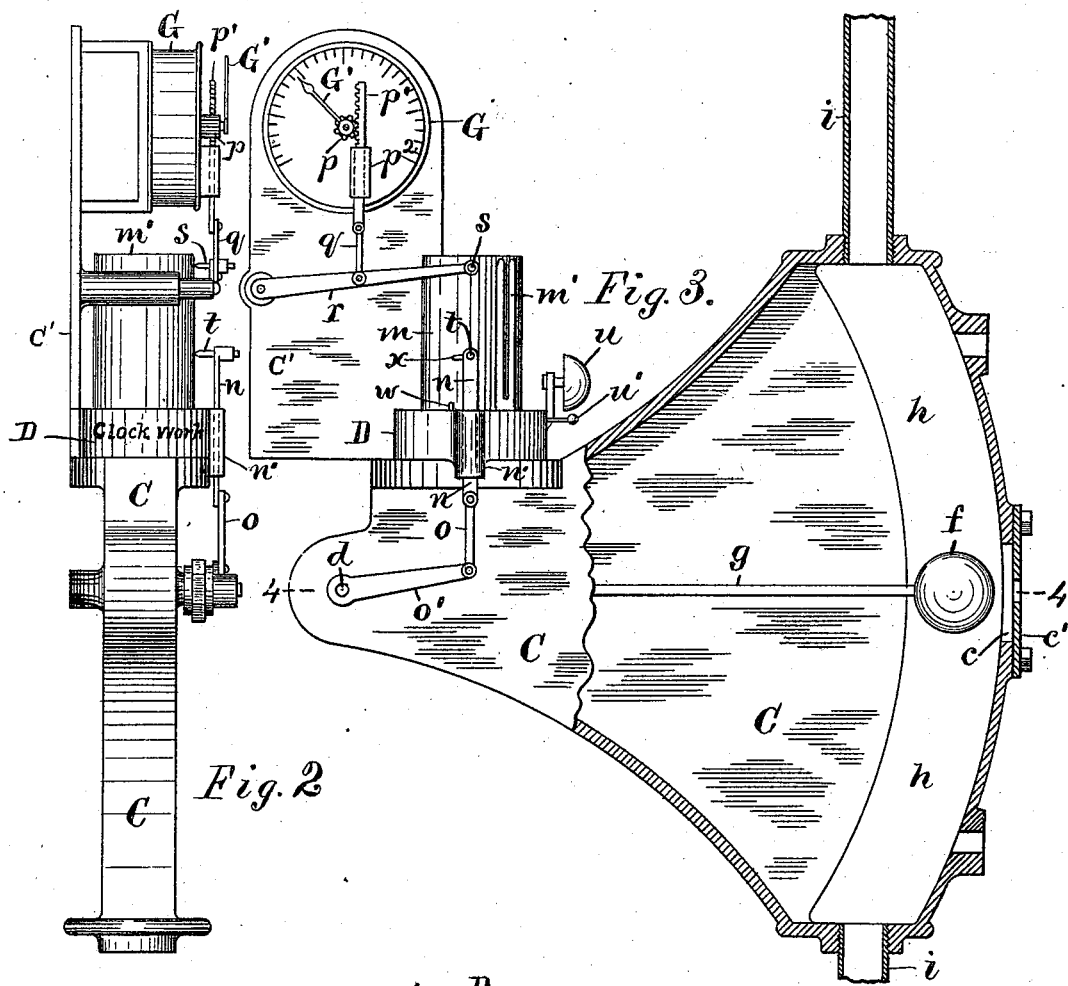
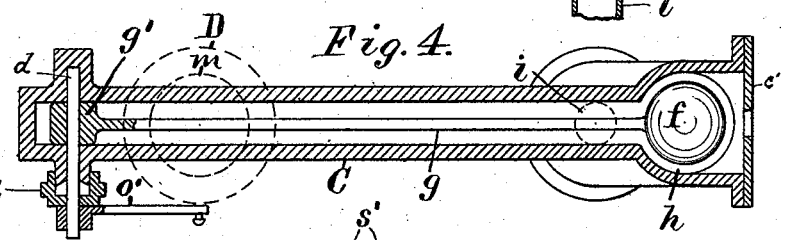
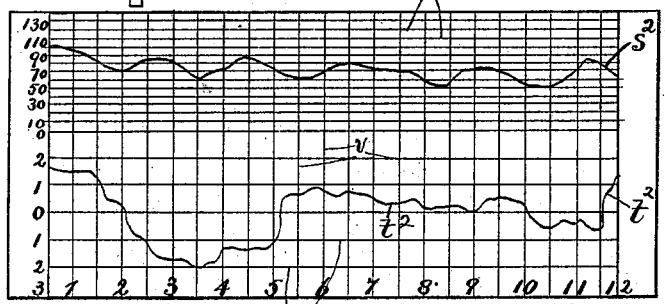
Attest:
L. Lee
Edw. F. Kinsey
Inventor.
Emil Holthaus,
per Crane & Miller, attys.

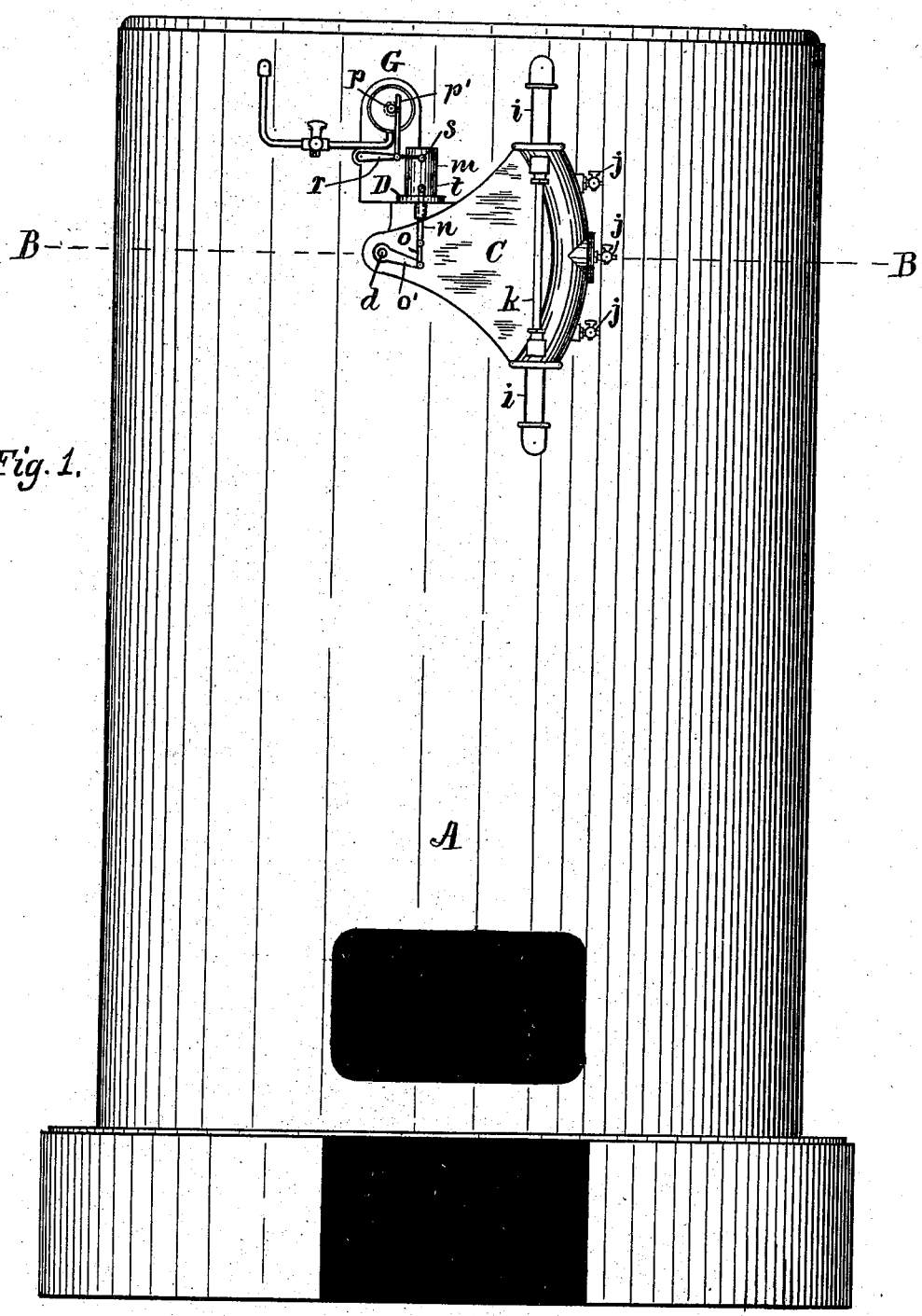

UNITED STATES PATENT OFFICE.

EMIL HOLTHAUS, OF BARREN ISLAND, NEW YORK.

RECORDING STEAM AND WATER GAGE.

SPECIFICATION forming part of Letters Patent No. 503,968, dated August 29, 1893.

Application filed November 30, 1892. Serial No. 453,607. (No model.)

*To all whom it may concern:*

Be it known that I, EMIL HOLTHAUS, a citizen of the United States, residing at Barren Island, Kings county, New York, have invented certain new and useful Improvements in Recording Steam and Water Gages, fully described and represented in the following specification and the accompanying drawings, forming a part of the same.

This invention relates to that class of measuring and recording instruments for steam boilers in which a pressure gage and a water level indicator are each provided with means for recording upon the same paper their respective operations through a given space of time.

The invention consists in the specific construction for such instrument herein shown, described, and claimed.

My improvements are illustrated in the annexed drawings, in which—

Figure 1 is a diagram showing a vertical cylindrical boiler with the apparatus attached thereto. Fig. 2 is an edge view of the apparatus detached from the boiler and drawn upon a larger scale. Fig. 3 is a front elevation of the apparatus with a portion of the float chamber in section. Fig. 4 is a horizontal section on line 4—4 through the float chamber; and Fig. 5 is a diagram of the paper chart removed from the drum and exhibiting the lines traced by the markers.

A is the steam boiler, with a line B—B drawn across the same to indicate the normal water level.

C is a casing forming a float chamber, of sectoral shape, with an aperture $c$ having a cover $c'$ to introduce the float $f$. The float is connected by an arm $g$ with a spindle $d$ pivoted transversely across the narrow end of the chamber; the opposite end of which is curved in conformity with the movement of the float $f$. The opposite ends of the channel $h$ in which the float moves are connected by pipes $i$ with the boiler above and below the water line B, B, thus maintaining the same level in the float chamber as in the boiler.

The float chamber is provided with several gage cocks $j$ to test the water level, and a glass water gage $k$ is also attached to one side of the chamber to show the water level by inspection.

A stuffing box $l$ is provided at the outer end of the spindle $d$ upon which is fixed the hub $g'$ of the float lever $g$. A case D containing a clock movement is fixed upon the float chamber, a drum $m$ being rotated thereby at the same rate as the hour spindle of the movement. Clips $m'$ are attached to the drum as in the case of steam engine indicators, to hold a paper blank thereon in a manner already known. A slider $n$ is fitted to a guide $n'$ adjacent to the lower end of the drum, and is connected by a link $o$ with an arm $o'$ attached to the spindle $d$. The slider carries a marker $t$. A steam gage G, of suitable construction to rotate a spindle is also fixed to a plate C' formed integral with the casing C adjacent to the clock movement; and the spindle of the gage to which the hand or pointer G' is fixed is provided with a pinion $p$ fitted to a sliding rack $p'$. The rack is sustained in a guide $p^2$ adjacent to the pinion, and is connected by link $q$ with an arm $r$ bearing a marker $s$ adjacent to the drum $m$.

The markers or pencils $s$ and $t$ are arranged to bear upon the same hour line upon the paper when applied to the drum, the hour lines upon the paper being indicated at $v$ in Fig. 5. The marker $s$ is arranged to move over the upper part of the paper, which is ruled with horizontal lines $s'$ numbered to correspond with the variations of pressure indicated by the gage G. The marker $t$ is arranged to move over the lower part of the paper which is ruled with horizontal lines $t'$ corresponding with the inches of variation in the water level above or below the normal, as figured on the chart or diagram. The movement of the marker $t$ is diminished in the proportion that the arm $o'$ is shorter than the arm $g$.

An alarm bell $u$ is shown attached to the clock movement case with a hammer $u'$ adapted to ring the bell when released. A pin $w$ is shown projecting from the top of the clock case adjacent to the slider $n$, and a stud $x$ is formed upon the slider to press upon such pin when the limit of low water level is reached, and set in motion the alarm hammer $u'$.

The diagram in Fig. 5 shows the paper ruled with vertical lines $v$, representing each one half hour of time, and shown intersected by the line $s^2$ produced by the pencil $s$ and the line $t^2$ produced by the pencil $t$. The intersection of the lines $s^2$ and $t^2$ with the horizontal and vertical lines upon the paper shows the variation in pressure and water level at any moment of time through the period covered by the movement of the paper.

Having thus set forth the invention, what I claim is—

1. The combination, with the casing C provided at one edge with the transverse spindle $d$, carrying the exterior arm $o'$ and the interior float arm $g$, and having the concentric channel $h$ at the opposite edge, of the float $f$ fixed to the outer end of the arm $g$ within the channel $h$, the slider $n$ carrying the pencil $t$ at one end and connected at the opposite end by means of the link $o$ to the arm $o'$, and the cylinder $m$ rotated as described, substantially as and for the purpose set forth.

2. A measuring and recording instrument for steam boilers comprising the casing C formed with the integral plate $C'$, the cylinder $m$ the clock-work for rotating said cylinder, the float $f$ and pencil $t$ with means as described for connecting the same, the steam gage G with pinion $p$ fixed upon its spindle, the rack $p'$ fitted to the guide $p^2$, the arm $r$ pivoted to a fixed pin at one end and carrying at the other end the pencil $s$ and connected intermediate to its ends to the rack $p'$, the whole arranged and operated as herein shown and described.

In testimony whereof I have hereunto set my hand in the presence of two subscribing witnesses.

EMIL HOLTHAUS.

Witnesses:
THOMAS S. CRANE,
L. LEE.